United States Patent

Kuriaki et al.

Patent Number: 5,812,314
Date of Patent: Sep. 22, 1998

[54] LENS CONTAMINATION PREVENTIVE DEVICE OF LIGHT-BEAM HEATER

[75] Inventors: Hiroyuki Kuriaki, Kaga; Kazusige Hirasawa, Kawanishi, both of Japan

[73] Assignee: Matsushita Electric Industrial Co., Ltd., Osaka, Japan

[21] Appl. No.: 803,178

[22] Filed: Feb. 19, 1997

[30] Foreign Application Priority Data

Feb. 29, 1996 [JP] Japan ................................ 8-042569

[51] Int. Cl.$^6$ .............................. G02B 7/18; B23K 9/02
[52] U.S. Cl. .......................... 359/507; 359/808; 359/894; 219/121.5; 219/121.68
[58] Field of Search ............................ 359/507, 509, 359/667, 808, 811, 894, 809; 219/121.5, 121.51, 121.6, 121.63, 121.67; 15/300.1, 320–322

[56] References Cited

U.S. PATENT DOCUMENTS 3,696,230 10/1972 Friedrich ............................. 359/509
4,778,693 10/1988 Drozdowicz et al. ............... 219/121.6
4,987,286 1/1991 Allen ..................................... 219/121.6

FOREIGN PATENT DOCUMENTS 63-9175 1/1988 Japan ..................................... 359/509
2-73141 3/1990 Japan ..................................... 359/509

Primary Examiner—Thong Nguyen
Attorney, Agent, or Firm—Stevens, Davis, Miller & Mosher, L.L.P.

[57] ABSTRACT

A lens contamination preventive device comprises a gas jetting device for jetting out gas and a gas suction device for suctioning gas which are disposed to face each other with respect to an optical axis of light emitted through a lens. The gas jetting device and the gas suction device are disposed so as to form a layer of gas jet stream in the vicinity of a surface of the lens. The gas jetting device has a gas jetting port, a width of which is greater than a diameter of the lens. The gas suction device has a rate of suction greater than a rate of jet from the gas jetting device.

8 Claims, 5 Drawing Sheets

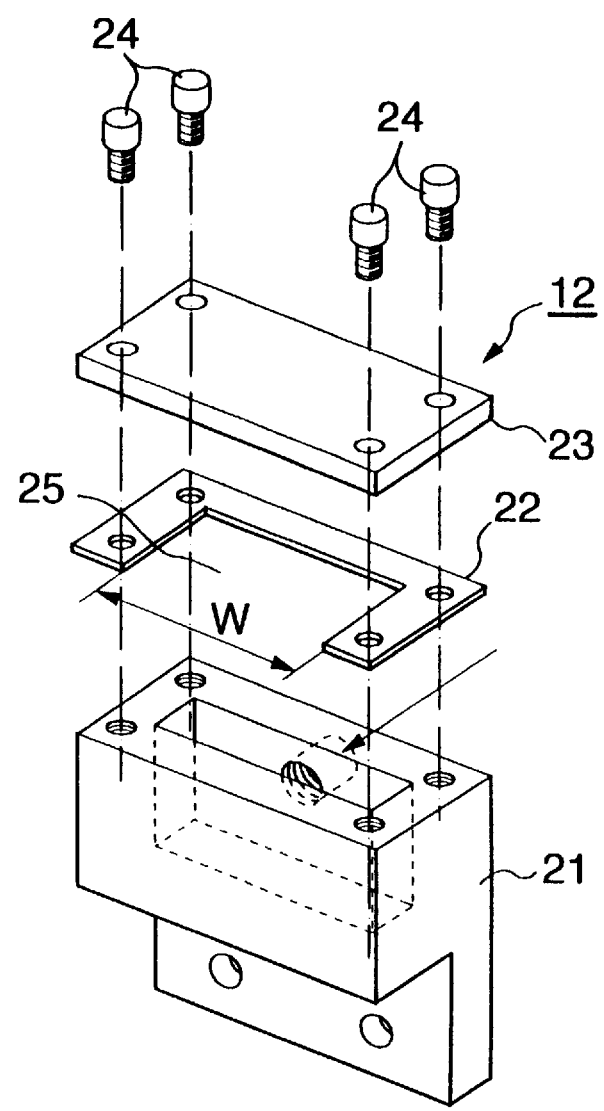

LENS CONTAMINATION PREVENTIVE DEVICE OF LIGHT-BEAM HEATER

BACKGROUND OF THE INVENTION

This invention relates to a lens contamination preventive device of a light-beam heater used in a soldering apparatus, a laser working apparatus and the like.

In a light-beam heater, light from a light-emitting lamp is condensed to enter an optical fiber from one end thereof and, after emerging from the opposite end, condensed again through an optical system so as to heat an object to be heated placed in the vicinity of a condensing point. Recently, this kind of light-beam heater is beginning to be widely used for a soldering heat source as non-contact local heater.

Now, description will be given of a conventional light-beam heater. FIG. 3 is a block diagram showing a construction of a light-beam heater. In FIG. 3, reference numeral 31 denotes a light-emitting lamp such as a Xenon lamp, 32 denotes an electric power supply for supplying electric current to the light-emitting lamp 31, and 33 denotes an ellipsoidal reflector mounted in such a manner that a light-emitting portion of the light-emitting lamp 31 is located on a first focal point of the ellipsoidal reflector 33. Reference numeral 34 denotes a flexible optical fiber composed of a bundle of several hundred fiber strands. A light-receiving end 34a of the optical fiber 34 is fixed in the position of a second focal point of the ellipsoidal reflector 33. Reference numeral 35 denotes a lens unit in which an optical lens system is incorporated for condensing the light emerged from an emitting end 34b of the optical fiber 34. Reference numeral 36 denotes an object to be heated by the light condensed by the lens unit 35.

Now, description will be given of a conventional lens contamination preventive device of a soldering apparatus employing a light-beam heater.

FIG. 4 shows a construction of a conventional lens contamination preventive device.

In FIG. 4, reference numeral 1 denotes a lens case, and 2 denotes a lens fixed in the lens case. Reference numeral 4 denotes a suction nozzle made of a hollow pipe and connected to a suction device (not shown). Reference numeral 5 denotes a holding metal fittings by means of which the lens case 1 and the suction nozzle 4 are fixedly connected. Reference numeral 6 denotes a guide tube and 7 denotes solder thread. Reference numeral 8 denotes a soldering point on which the light condensed through the lens 2 is applied. Reference numeral 9 denotes an object to be soldered such as a printed substrate.

Operation of the lens contamination preventive device having the above construction will be described below. First, light emerged from the flexible optical fiber 34 is condensed through the lens 2 to heat the soldering point 8. After the elapse of a predetermined heating time, a fixed amount of solder thread 7 is fed to the soldering point 8 to perform the soldering. After the elapse of another predetermined time, application of light is stopped, thus completing the soldering. In order to prevent the lens from being contaminated, during the soldering operation, suction of fumes generated is performed by the suction nozzle 4.

However, with the above conventional construction, it is possible to prevent the flux component contained in the solder thread 7 and gasified (turned into fumes) by being heated from adhering to the lens 2, but it is not possible to prevent the liquefied flux particles scattered from adhering to the lens 2. For this reason, if the soldering operation is performed repeatedly, a very small amount of flux particles are caused to adhere to and accumulate on the lens 2 to deteriorate the light-transmission coefficient of the lens 2, giving rise to a problem that it becomes impossible to obtain an optical output required to perform the soldering and hence it becomes impossible to perform the soldering.

This is because the liquefied flux particle is greater in weight than fumes. Attributed to the boiling of the flux at the time of soldering, the flux particles are explosively scattered, so that the initial velocity thereof is high when generated.

This gives rise to a problem that it is impossible for the suction nozzle 4 to prevent the lens 2 from being contaminated owing to the scatter of the flux particles.

SUMMARY OF THE INVENTION

It is therefore an object of the present invention to provide a lens contamination preventive device which is capable of preventing flux particles from adhering to a lens.

To achieve this end, a lens contamination preventive device according to the present invention comprises gas jetting means for jetting out gas and gas suction means for suctioning gas which are disposed to face each other with respect to an optical axis of light emitted from a lens.

It is preferred that the gas jetting means have a gas jetting port a width of which is greater than a diameter of the lens.

It is preferable that the gas jetting means be disposed so as to form a layer of gas stream in the vicinity of a surface of the lens.

Preferably, the gas jetting means comprises a jetting nozzle body, and a nozzle cover having an opening to outside formed in a portion thereof.

It is also preferred that the gas jetting means comprise a jetting nozzle body, a nozzle cover, and a spacer having an opening to outside formed in a portion thereof and disposed between the jetting nozzle body and the nozzle cover.

Preferably, the gas suction means has a rate of suction greater than a rate of jet flow from the gas jetting means.

In accordance with a lens contamination preventive device of the present invention having the above construction, the gas jetting means enables flux particles having heavy weight, as well as fumes, to be caught in a layer of gas stream. This layer of gas stream is taken in by the gas suction means so that the fumes and flux particles are prevented from reaching the lens, thereby making it possible to prevent the contamination of the lens.

The whole surface of the lens is shielded from the flux particles by the layer of gas stream jetted out of the gas jetting port having a width larger than a diameter of the lens, and therefore the contamination of the lens can be avoided with more reliability.

Since the layer of gas stream is formed in the vicinity of the surface of the lens, it is hardly possible that the flux particles will reach the lens by bypassing the side of the layer of gas stream, with the result that the effect of preventing the contamination of the lens is further insured.

The gas jetting means comprises the jetting nozzle body and the nozzle cover having an opening to outside formed in a portion thereof, and therefore it is possible to form various layers of fluid only by replacing the nozzle cover with other ones with different opening areas. In consequence, it is possible to obtain an optimum fluid layer dependent on the workpiece and the machining conditions.

The gas jetting means comprises the jetting nozzle body, the nozzle cover, and the spacer having an opening to outside formed in a portion thereof and disposed between the jetting nozzle body and the nozzle cover, and therefore it is possible to form a variety of fluid layers only by replacing the spacer with other ones of different sizes. It is also possible to reduce the storage space because the replacement parts are small.

Since the rate of suction of the gas suction means is greater than the rate of jet flow from the gas jetting means, the gas suction means can take in all of the gas containing the fumes and flux particles, with the result that the contamination of the surroundings of the lens contamination preventive device can be avoided.

BRIEF DESCRIPTION OF THE DRAWINGS

FIG. 2 is an exploded perspective view of a compressed air jetting nozzle of the lens contamination preventive device of the present invention;

DESCRIPTION OF THE PREFERRED EMBODIMENT

Figure 1:
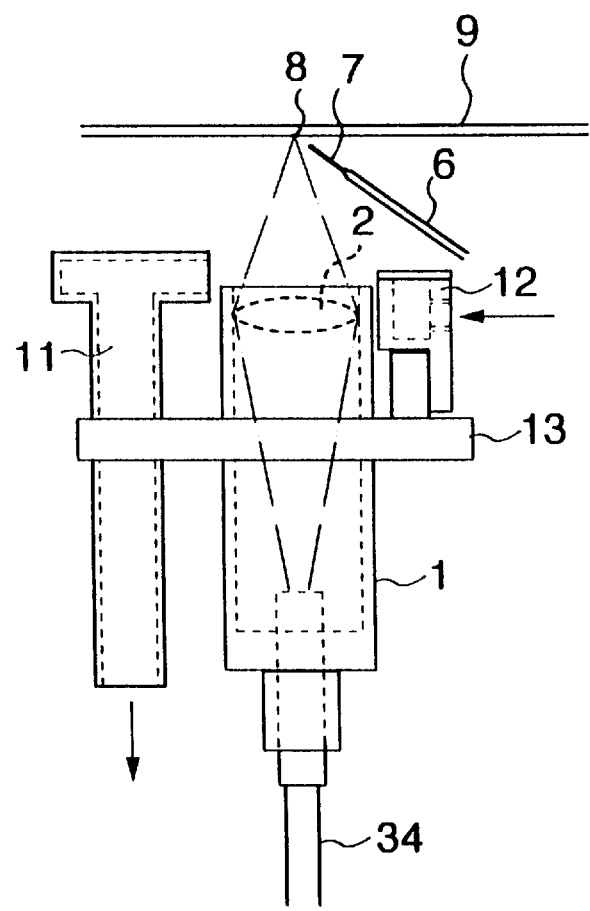
FIG. 1 is a view showing a construction of a lens contamination preventive device according to the present invention.

Now, description will be given of a lens contamination preventive device of a light-beam heater according to the present invention by referring to the drawings.

FIG. 1 shows a construction of a lens contamination preventive device according to the present invention.

Reference numeral 1 denotes a lens case, and 2 denotes a lens fixed in the lens case 1. Reference numeral 6 denotes a guide tube, 7 denotes solder thread, and 8 denotes a soldering point on which light is condensed. Reference numeral 9 denotes an object to be soldered such as a printed substrate. Reference numeral 11 denotes an air suction nozzle connected to a suction device (not shown). Reference numeral 12 denotes a compressed air jetting nozzle connected to a compressed air supply source (not shown). Reference numeral 13 denotes a holding metal fitting by means of which the air suction nozzle 11, the compressed air jetting nozzle 12 and the lens case 1 are fixedly connected.

FIG. 2 is an exploded perspective view of a compressed air jetting nozzle employed in the lens contamination preventive device of this invention. Reference numeral 21 denotes a compressed air jetting nozzle body, and 22 denotes a spacer with a slit-like opening 25 which determines the rate of air jet flow (or the thickness of a jetting port). Incidentally, a width W of the opening 25 is larger than a diameter of the lens 2. Reference numeral 23 denotes a cover and 24 denotes a bolt.

Operation of the lens contamination preventive device with the above construction will be described below.

FIG. 1 shows a case where the soldering is performed from below the object 9 to be soldered, that is, the lens 2 will be most contaminated by the flux.

Light emitted from the flexible optical fiber 34 is condensed through the lens 2 on the soldering point 8 to heat the object 9 to be soldered. After the elapse of a predetermined time, the solder thread 7 is fed through the guide tube 6 by a fixed amount and then suspended from being fed. After the elapse of another predetermined time, the light is suspended from being emitted, thus completing the soldering. During the soldering operation, the air suction nozzle 11 carries out suction, while the compressed air jetting nozzle 12 carries out jetting of the compressed air.

When soldering, the solder thread 7 is fed to the soldering point 8 and heated so that the flux component contained in the solder thread 7 becomes fumes in the form of white smoke and corpuscular flux particles which are to be scattered. At this time, since the air suction nozzle 11 carries out suction, the fumes generated from the soldering point 8 in the form of white smoke, the specific gravity of which is light, move along the flow of air taken into the air suction nozzle 11 so as to be sucked into the air suction nozzle 11. The corpuscular flux particle has a heavy specific gravity and is caused to expand, boil and scatter due to heating at the time of soldering, and therefore it is scattered at a certain initial velocity. For this reason, it is impossible to prevent the flux particles from scattering toward the lens 2 only by making use of the air stream caused by the air suction nozzle 11. To cope with this, the compressed air jetting nozzle 12 having an opening of a size larger than the diameter of the lens 2 is provided to form a layer of compressed air stream flowing at high speed in the vicinity of the surface of the lens 2. This causes the scattering direction of the flux particles to change so that the flux particles are prevented from adhering to the surface of the lens 2. The flux particles having their scattering direction changed moves with the air stream so as to be sucked into the air suction nozzle 11.

As described above, the lens contamination preventive device of the present invention comprises the compressed air jetting nozzle 12 having a slit-like opening 25 of a size larger than the diameter of the lens 2 and the air suction nozzle 11, the nozzles 11 and 12 being disposed to face each other with respect to the lens 2. Therefore, the fumes and the scattered flux particles generated from the flux component contained in the solder thread 7 at the time of soldering are removed in such a manner that the fumes are directly sucked into the air suction nozzle 11, while the scattered flux particles are caused to move with the air stream jetted out of the compressed air jetting nozzle 12 so as to be sucked into the air suction nozzle 11 before adhering to the lens 2, thereby making it possible to prevent the lens 2 from being contaminated. This makes it possible to operate the light-beam soldering apparatus continuously for a long time.

In this embodiment, the compressed air jetting nozzle 12 is constructed such that the compressed air jetting nozzle body 21, the cover 23, and the spacer 22 put between them are fixed together by means of the bolts 24, but it may be structured by the cover 23 which is integrated with the spacer 22, and the compressed air jetting nozzle 21. Even in the case of such construction, it is possible to vary the rate of air jet flow by replacing the parts.

Figure 2A:
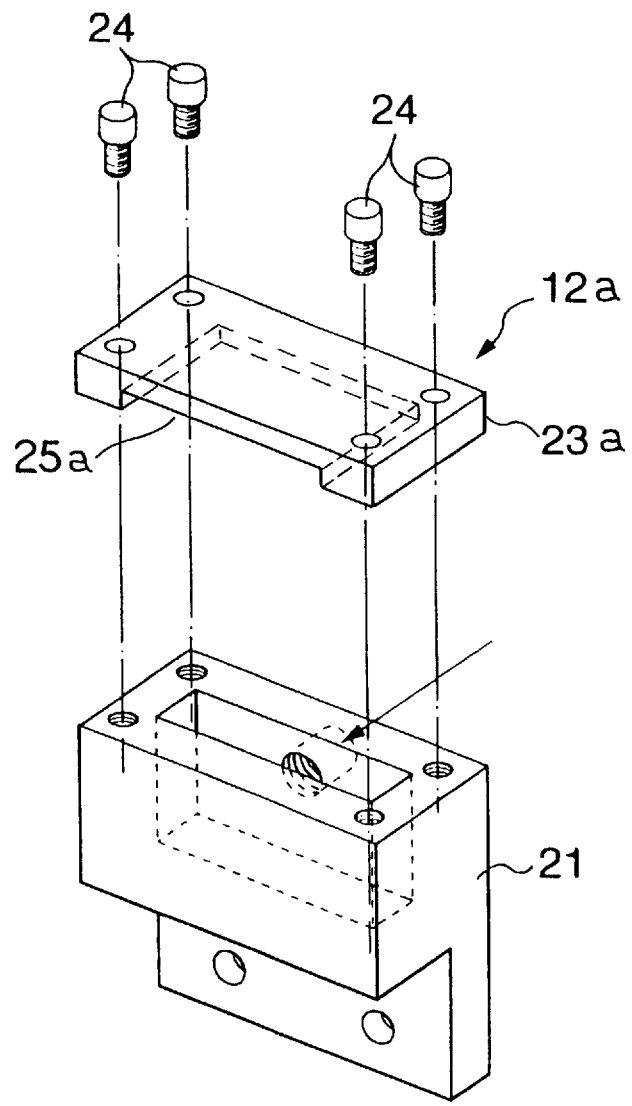
FIG. 2A is an exploded perspective view of a modified compressed air jetting nozzle of the lens contamination preventive device of the present invention.
Figure 3:
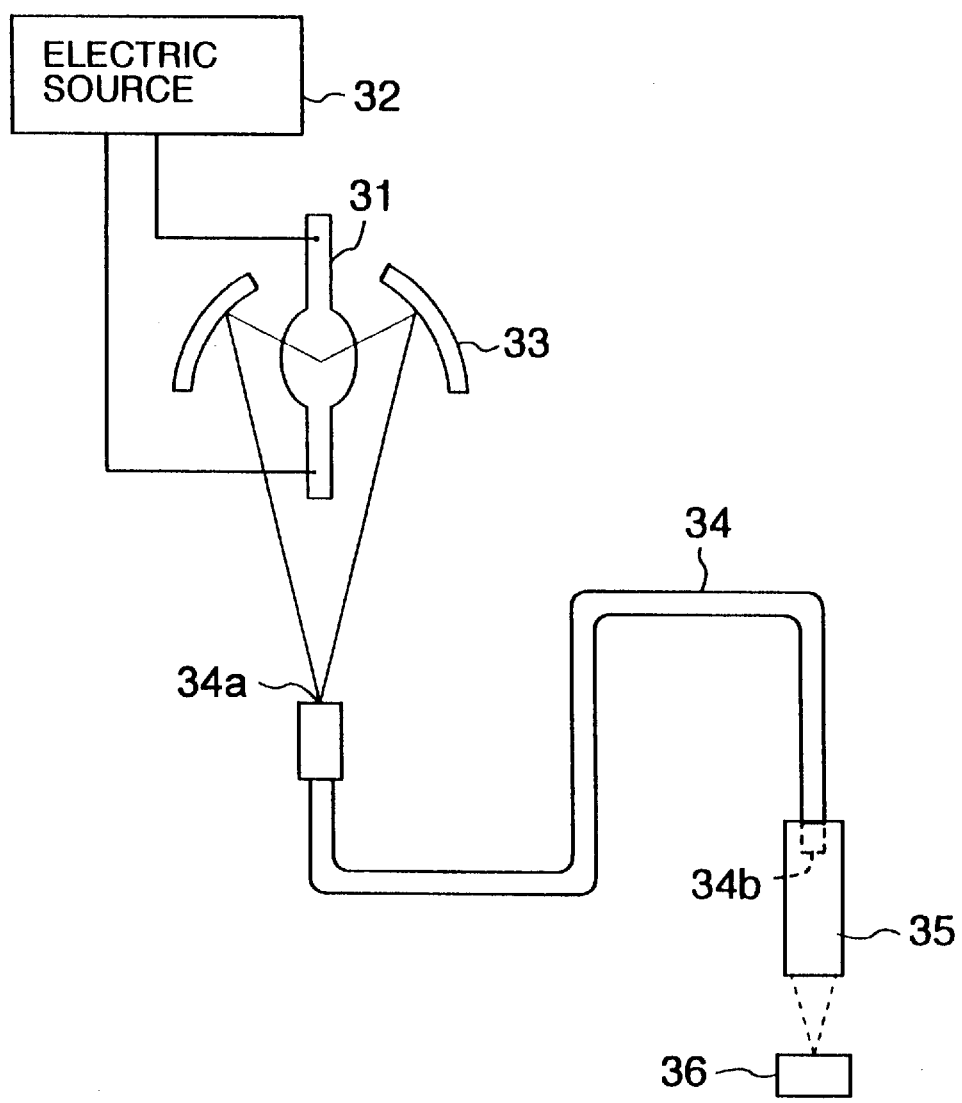
FIG. 3 is a block diagram showing a construction of a light-beam heater.
Figure 4:
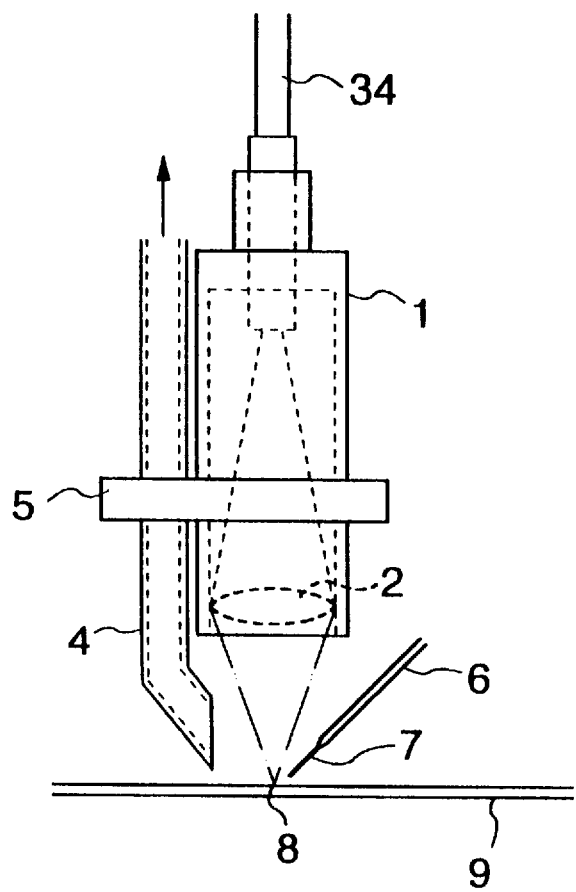
FIG. 4 is a view showing a construction of a conventional lens contamination preventive device.

Further, the rate of air suction of the air suction nozzle 11 may be set to be greater than the rate of jet flow from the compressed air jetting nozzle 12, in which case it is possible to prevent the contamination of the surroundings of the lens contamination preventive device as well, thus contributing to more excellent effects. Fig. 2A shows a modification of the compressed air jetting nozzle. As shown in FIG. 2A, compressed air jetting nozzle 12a includes nozzle cover 25a having opening 23a to outside formed in a portion thereof. Thus, it will be readily apparent that spacer 22 is not needed.

What is claimed is:

1. A lens contamination preventive device for a light-beam heating soldering device in which light is emitted through a lens for heating, the device comprising:

gas jetting means for jetting out gas, the gas jetting means being disposed with respect to the lens so as to form a layer of gas stream in a vicinity of a surface of the lens; and gas suction means for suctioning the gas;

the gas jetting means and gas suction means being disposed to face each other with respect to an optical axis of the light emitted through the lens.

2. A lens contamination preventive device according to claim 1, wherein the gas jetting means has a gas jetting port, a width of which is greater than a diameter of the lens.

3. A lens contamination preventive device according to claim 1, wherein the gas jetting means comprises: a jetting nozzle body; and a nozzle cover disposed on the jetting nozzle body and having an opening to outside formed in a portion of the nozzle cover.

4. A lens contamination preventive device according to claim 1, wherein the gas jetting means comprises: a jetting nozzle body;

a nozzle cover; and a spacer having an opening to outside formed in a portion of the spacer and disposed between said jetting nozzle body and said nozzle cover.

5. A lens contamination preventive device according to claim 4, wherein the gas jetting means further comprises at least one bolt for securing the jetting nozzle body, the nozzle cover and the spacer together.

6. A lens contamination preventive device according to claim 1, wherein the gas suction means has a rate of suction greater than a rate of jet flow from the gas jetting means.

7. A lens contamination preventive device according to claim 1, wherein:

the light-beam heating soldering device comprises a lens case for enclosing the lens; and the lens contamination preventive device further comprises a fitting for fixing the gas suction means, the gas jetting means and the lens case together.

8. A light-beam heating soldering device for soldering a soldering point on an object, the device comprising:

guide means for applying solder to the soldering point;

a lens for focusing light onto the soldering point, the light having an optical axis;

gas jetting means for jetting out gas, the gas jetting means being disposed with respect to the lens so as to form a layer of gas stream in a vicinity of a surface of the lens; and gas suction means for suctioning the gas;

the gas jetting means and gas suction means being disposed to face each other with respect to an optical axis of the light emitted through the lens.

\* \* \* \* \*